March 29, 1960 J. E. WHEELER 2,930,497
TWO-LEVEL STORAGE APPARATUS
Filed Aug. 27, 1957 7 Sheets-Sheet 1

INVENTOR
James E. Wheeler
BY Stevens, Davis, Miller & Mosher
ATTORNEYS

INVENTOR
James E. Wheeler
BY Stevens, Davis, Miller & Mosher
ATTORNEYS

INVENTOR
James E. Wheeler

March 29, 1960   J. E. WHEELER   2,930,497
TWO-LEVEL STORAGE APPARATUS
Filed Aug. 27, 1957   7 Sheets-Sheet 7
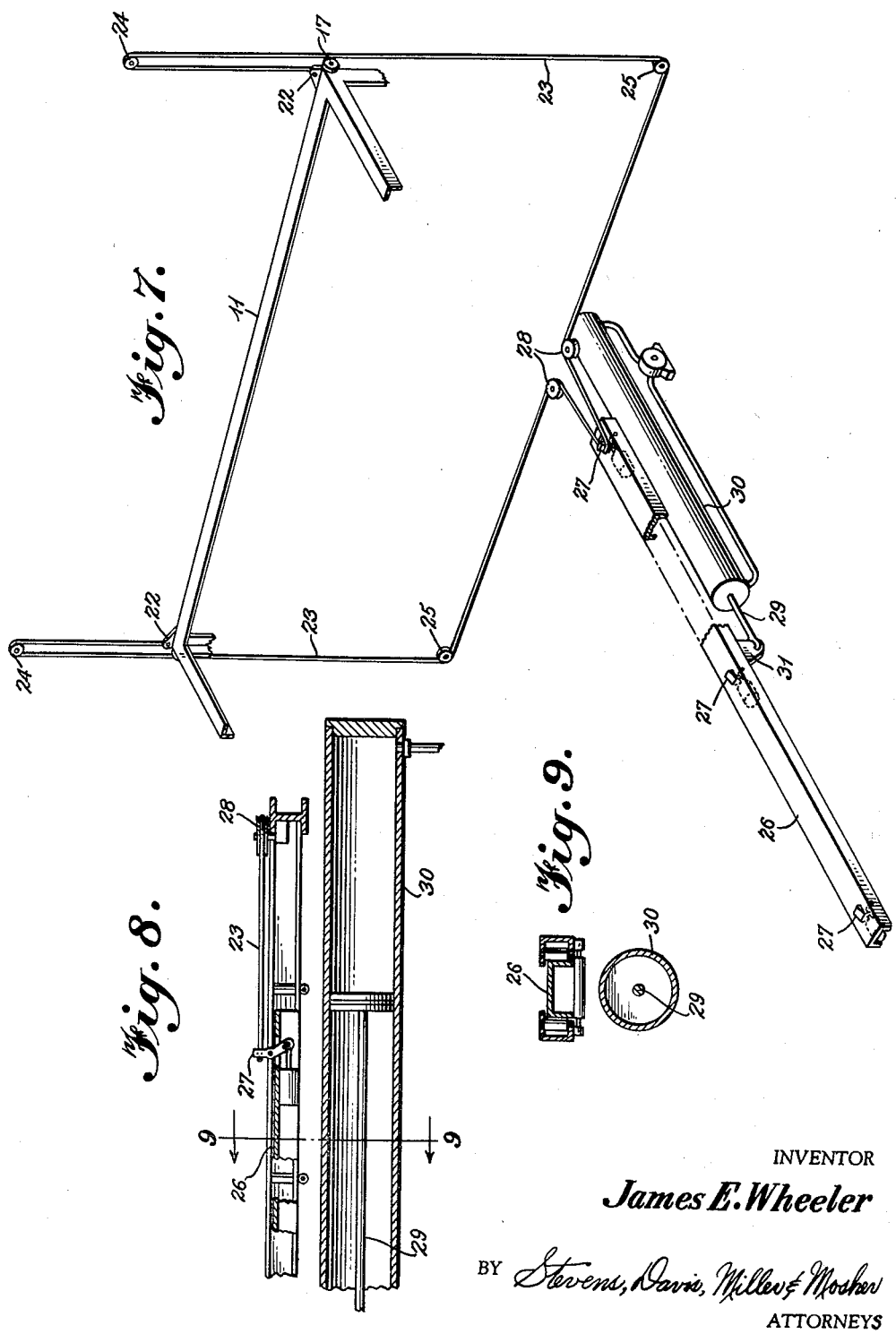
INVENTOR
James E. Wheeler
BY Stevens, Davis, Miller & Mosher
ATTORNEYS

United States Patent Office 2,930,497
Patented Mar. 29, 1960

2,930,497

TWO-LEVEL STORAGE APPARATUS

James E. Wheeler, Grand Rapids, Mich.

Application August 27, 1957, Serial No. 680,450

5 Claims. (Cl. 214—16.1)

This invention relates to improvements in storage apparatus and, more especially, such apparatus adapted for storing vehicles, for example, motor vehicles and the like.

By the use of my invention, there is great economy in space provided in the storing of motor vehicles and individual vehicles may readily be placed in storage and removed therefrom with little or no disturbance to the remaining vehicles and with no danger of injury by collison.

The efficiency of a garage or parking place has always been low because only a small amount of the total space is available to accommodate vehicles. Inasmuch as it is impossible to determine in advance the order in which parked vehicles will leave, it is necessary in any garage or parking place in which vehicles are driven to and from their parking spaces entirely under their own power, so to arrange all the spaces that there is always free access to each space irrespective of whether the others are occupied or not.

The objects of my invention are first, to provide improved means for making it possible to store a large number of vehicles in a given space, at the same time permitting entrance and removal of any vehicle to or from any storage space without removing any of the other stored vehicles.

The second object of my invention is to decrease the time required for moving a vehicle into storage and removing it therefrom. The invention is especially valuable for use in parking lots in metropolitan districts where storage space for motor vehicles is at a premium and where it may be desirable to more than double the available storage capacity of the conventional one-level parking lot with a minimum capital expenditure.

Among the features of my invention, is the provision of quick, easy, safe and economical storage for vehicles.

By the use of my invention, a large proportion of any given space may be effectively utilized for the storage of vehicles and, at the same time, any individual vehicle can be placed in storage or removed therefrom with a relatively small amount of movement of other stored vehicles and by way of paths that are direct and little wider than the vehicle.

Another new and novel feature of my invention is the development of vehicle carriers which will support the vehicle during vertical or horizontal movement.

Other objects, advantages and features of my invention will hereinafter appear.

According to this invention a parking arrangement is constructed at two levels, the lower level being below grade. Vehicle carriers above grade are normally adjacent and coupled together to form a train. Any number of carriers in a train may be shifted horizontally a distance equal to the width of one carrier thus providing a vertical passageway to the lower level. Means are provided to elevate any desired carrier below grade to the surface to receive or discharge a vehicle.

The invention will be best understood with reference to the accompanying drawings which illustrate a preferred embodiment of my invention.

Figure 7 is a perspective view of the elevating mechanism shown in plan in Figure 6.

Figure 8 is an enlarged view partly in section of the elevating mechanism illustrating a solenoid-operated cable hook in engaged position.

Figure 9 is a sectional view along the line 8—8 of Figure 8.

Figure 1:
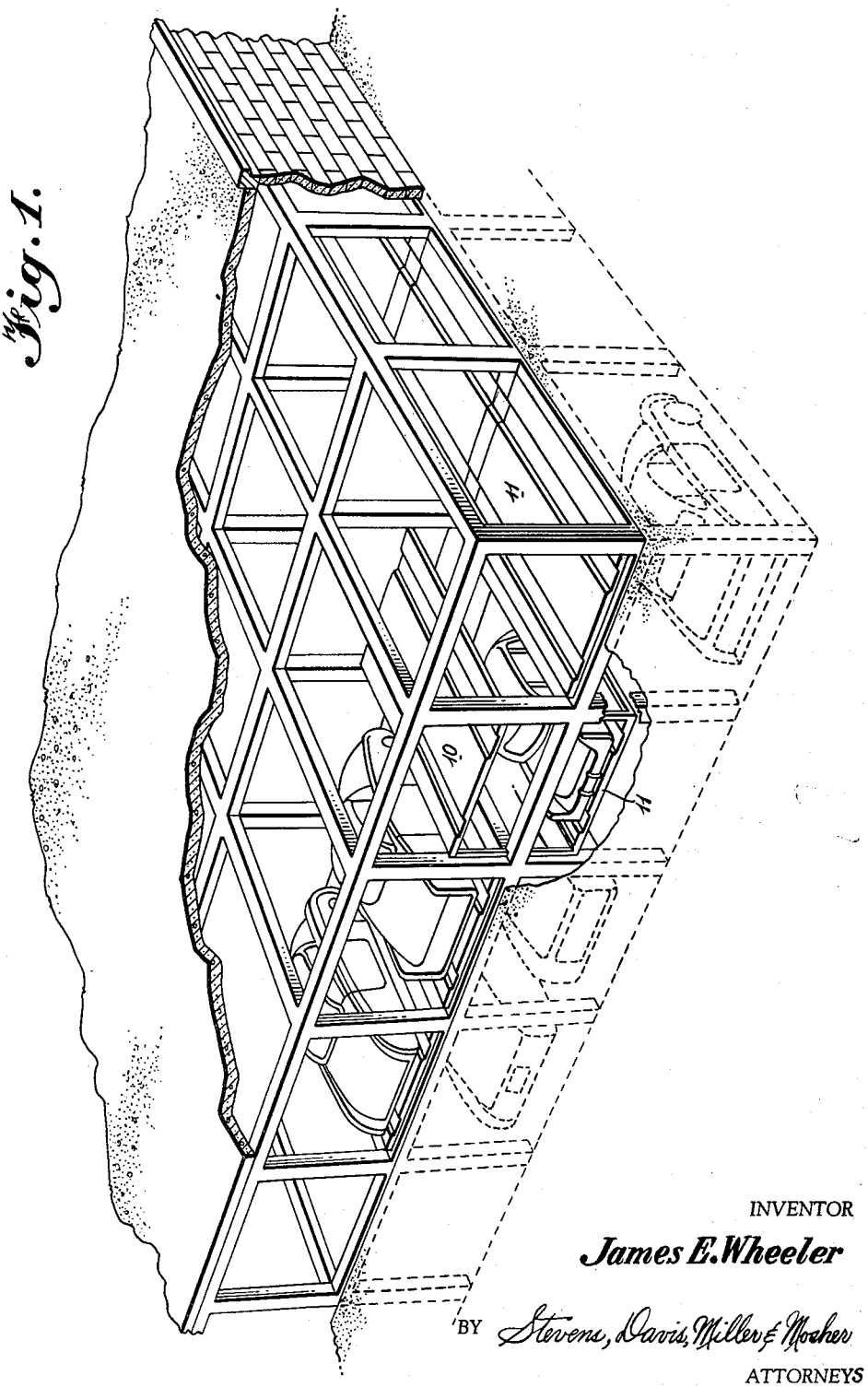
Figure 1 is a perspective view of a two-level parking arrangement constructed in accordance with my invention.
Figure 2:
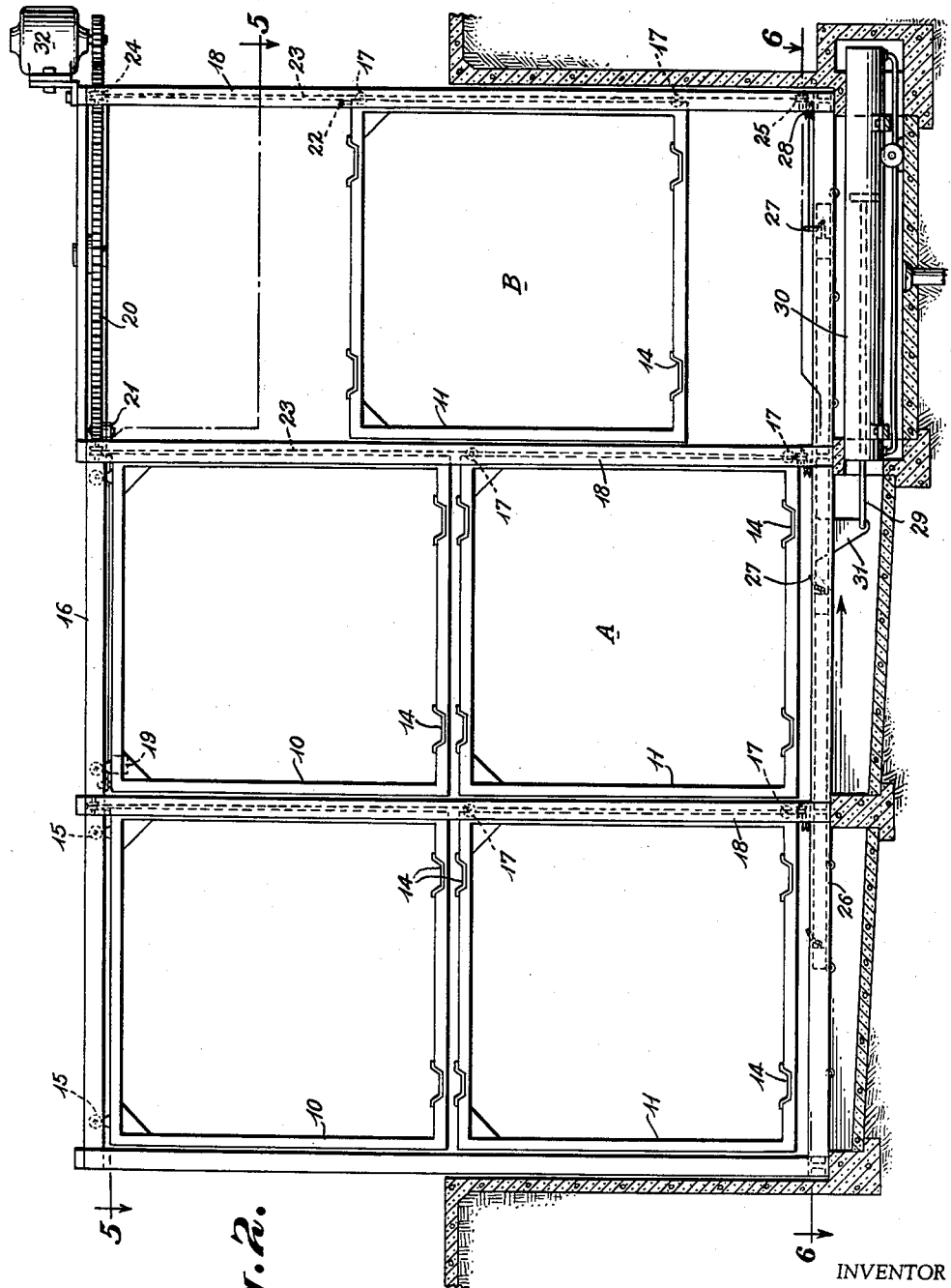
Figure 2 is a front elevation of the two-level parking arrangement illustrated in Figure 1.

Referring now to Figure 1, that drawing illustrates a parking lot open entirely at one end, access being from a public roadway or from a driveway about twenty-three feet in width. While not illustrated by the drawing, I prefer that both ends of the structure be open to provide ingress or egress at either or both ends. Figure 2 illustrates the basic structure which is made up of horizontal and vertical track members necessary for the vertical shifting of the vehicle carriers 11, illustrated in their position below grade, and for the lateral shifting of vehicle carriers 10, illustrated in their position above grade. While the arrangement illustrated by Figure 2 will accommodate only three vehicles in the lower rank and two vehicles in the upper rank, it will be appreciated that this storage system can be expanded to accommodate any number of vehicles in a single rank, the only limitation being the size of the lot available for construction. Furthermore, while the present description, for purposes of simplicity, will be limited to a single rank of vehicle carriers positioned at two levels; it is obviously practical to extend this construction to a rank and file arrangement, i.e., any number of parallel ranks that the available space will accommodate.

Figure 3:
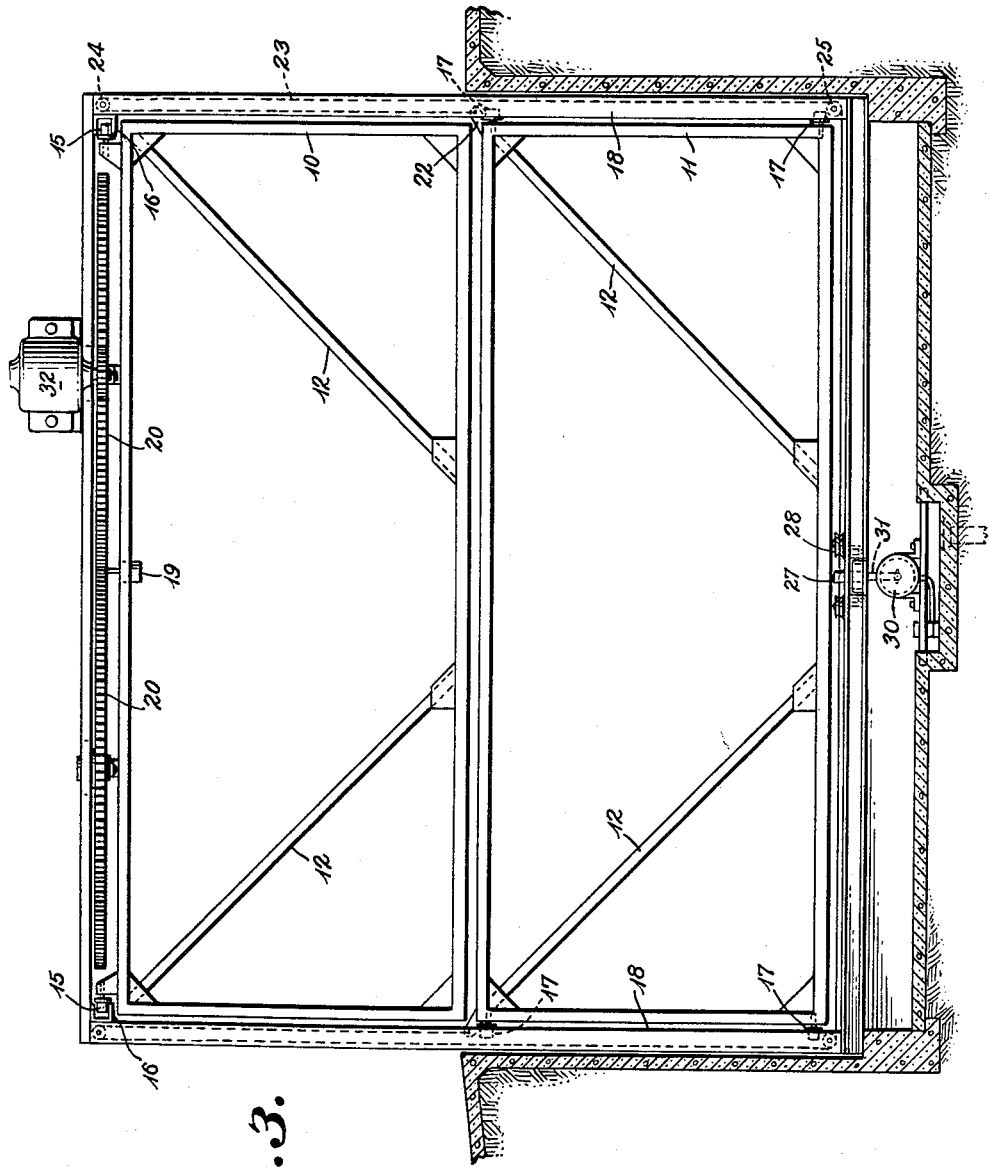
Figure 3 is a side elevation showing upper and lower vehicle carriers in position.
Figure 4:
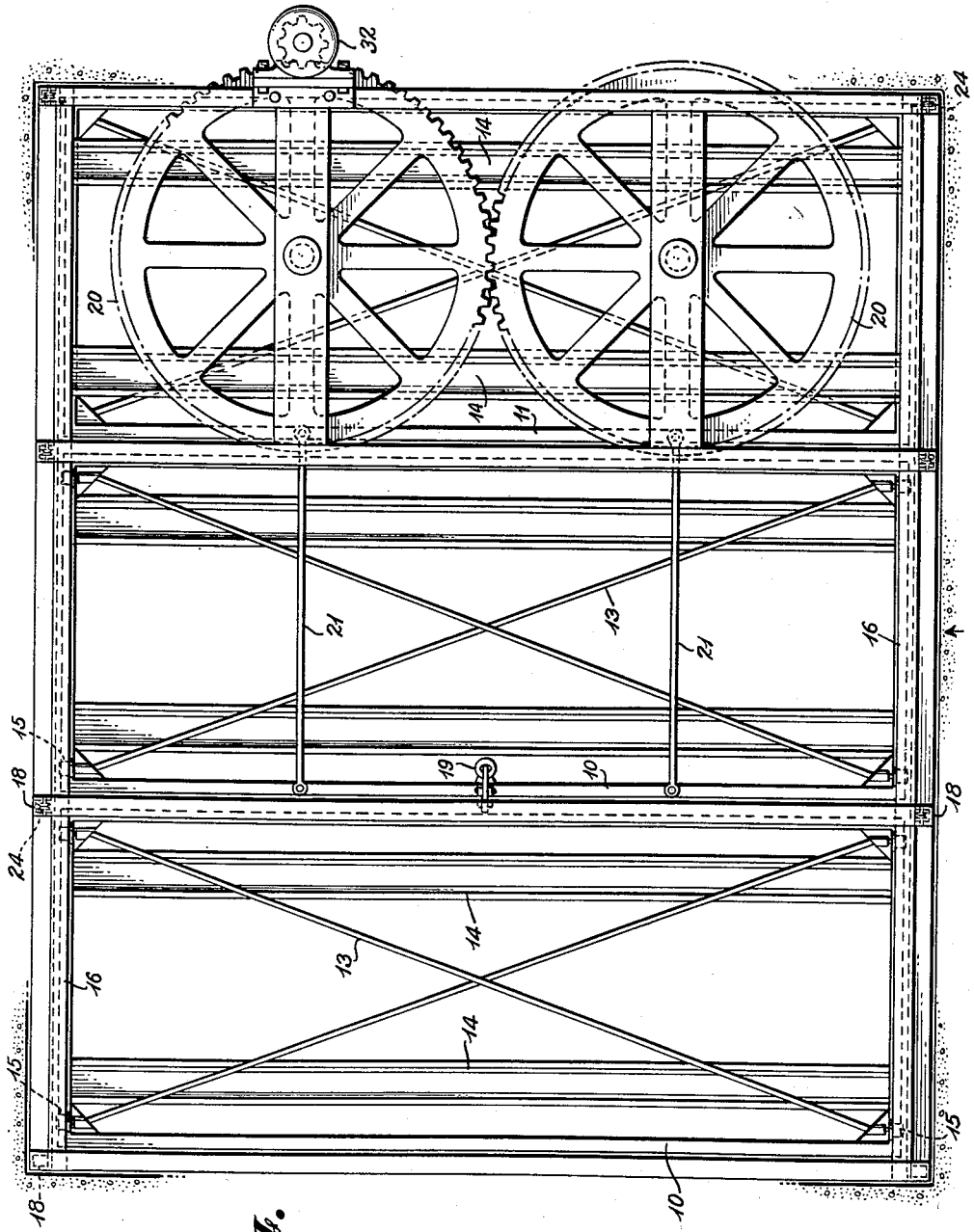
Figure 4 is a plan view illustrating the shift mechanism for lateral movement of the upper vehicle carriers.
Figure 5:
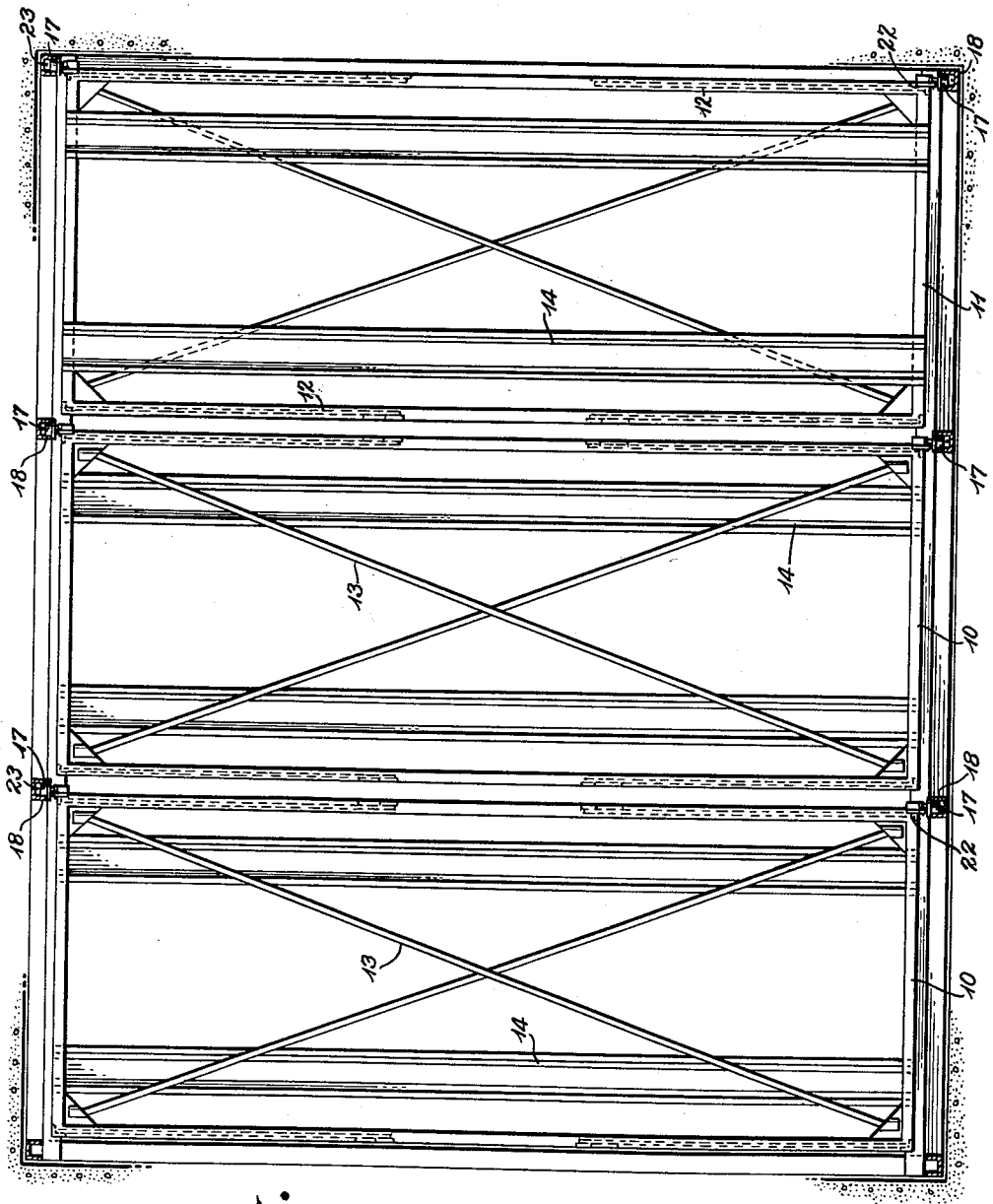
Figure 5 is a sectional view along the line 5—5 of Figure 2, showing tops of two left upper carriers and the top of the lower right carrier.
Figure 6:
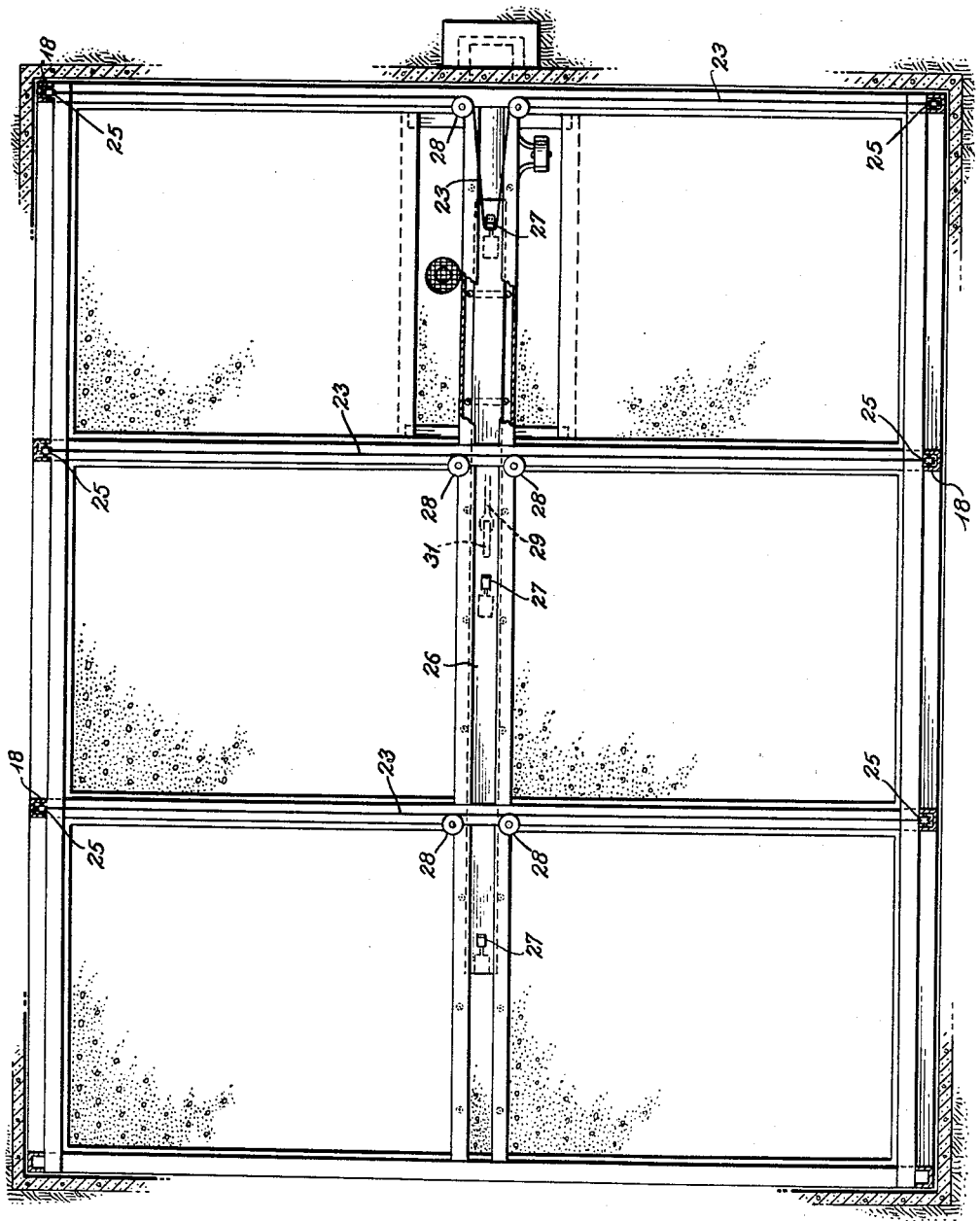
Figure 6 is a sectional view along the line 6—6 of Figure 2, or a plan view of hoisting mechanism for lower carriers.

Referring now to Figures 3 and 4, the upper vehicle carriers 10 and lower vehicle carriers 11 are similar in construction and consist of a box-like steel girder frame strengthened by lateral braces 12, top braces 13 and the longitudinal supports 14 spaced to accommodate the wheels of a vehicle. The longitudinal supports 14 positioned at the top of the lower vehicle carriers 11 enables one to drive a car over these carriers when they are in their lowered position. Each vehicle carrier is approximately eight feet wide by eight feet high and twenty feet in length. The vehicle carriers 10 are always above grade and are supported by the wheels 15 which roll in the channel 16 when the upper carriers are moved laterally.

The vehicle carriers 11 have attached thereto wheels 17 which engage the vertical channel 18 and facilitate vertical movement between the lower and upper levels.

The operation of the shift mechanism for the lateral movement of the vehicle carriers 10 is apparent from Figure 4. It will be observed from this drawing that individual vehicle carriers 10 may be joined to form a train by the solenoid-released gravity hook 19 present on the upper carrier 10. This hook coupling can be opened at any point to break the train of vehicle carriers by energizing the proper solenoid. Power sufficient to shift all vehicles within the rank is transmitted through intermeshed drive gears 20 that rotate in opposite directions, thus applying equal force through the pitman arms 21 to the end carriage 10 and throughout the train.

In a structure covering a substantial area in which there are a number of parallel ranks of vehicle carriers (i.e., rank and file arrangement), the lateral shifting of the vehicle carriers 10 permits a direct passageway to the street through which vehicles may be readily driven from the center of the parking area. Lateral shifting also opens a vertical passageway, permitting vertical movement of the lower vehicle carrier 11. It will be appreciated that the upper vehicle carriers 10 may be filled or emptied in either their normal position or shift position.

The vertical movement of the carriers 11 may be best understood by reference to Figure 7. Each of the carriers 11 is supported at two points 22 by a continuous cable 23 which passes over the pulleys 24 positioned in the top section of the structural framework and the pulleys 25 positioned beneath the vehicle carriers 11. The member 26 may be an inverted ship channel slidably supported beneath the carriers 11 in a central position so that the solenoid-operated cable hook 27 may engage the cable 23 between the horizontal pulleys 28. The member 26 is connected to a piston rod 29 of hydraulic cylinder 30 by the flange 31. Fluid may be admitted to either end of the cylinder 30 to obtain reciprocating motion of the piston rod 29. The piston rod 29 has a stroke of about eight feet which is sufficient to elevate the carrier 11 to its surface position after carrier 10 has been moved laterally to clear space. It will be noted that there are a plurality of solenoid cable hooks located on the channel 26, one for each carrier, in a position to engage the cable of any particular carrier. The carrier engaged and elevated will depend upon which solenoid is energized. Figures 8 and 9 illustrate details of the hydraulic piston, solenoid cable hook and support bearings for member 26.

The rapid movement of vehicles to and from storage that is possible by the use of my storage apparatus will be apparent from Figure 2. If the space below grade identified by the letter A is vacant, the vehicle may be stored in that position. It is first necessary to lower carrier B from the position shown in Figure 2. This is accomplished by admitting fluid to the hydraulic cylinder 30 to move the piston 29 and member 26 in the direction of the arrow. When the carrier B is in its bottom position, the carrier 10 above carrier A may be moved to the right by opening the solenoid operated gravity hook 19 and energizing the motor 32. The gears 20 are rotated 180°, which opens a vertical passageway above carrier A. The particular solenoid operated grab hook positioned to engage the cable 23 attached to carrier A is then energized and fluid is admitted to the hydraulic cylinder 30 forcing the piston 29 in a direction opposite to the arrow and simultaneously elevating the carrier A to ground level. After the vehicle has been driven onto the carrier A, the hydraulic cylinder 30 may be again operated to move the member 26 in the direction of the arrow, thus lowering carrier A to its original position. The motor 32 is then energized to rotate the gears 20 through 180°, returning the carrier 10 to its original position above carrier A and recoupling the upper carriers to form a train. To remove a vehicle from carrier A, the above sequence of events is repeated.

The arrangement described above is of particular advantage in providing parking facilities for businesses that have a problem with employee parking. The employee vehicles which arrive first and depart last can be stored at the lower level, leaving the entire upper level available for customers. The lateral shift principle also conserves a great deal of space as it is only necessary to provide a space, above ground level, the width of a single car for shifting. By the use of this single shift space, access to any available position in my storage apparatus may be had instantly.

The invention is not, of course, limited to the particular arrangements shown and described for many modifications are obviously possible.

I claim:

1. In a two-level storage structure, at least one rank of carriers normally positioned at the lower level and restricted to move in a vertical direction and at least one rank of carriers positioned at the upper level; and restricted to move in a horizontal direction; those carriers in each upper rank being vertically aligned with the carriers in each lower rank; a shift space at one end of each upper rank; means to connect any number of carriers in each upper rank to form a train; means to move the train to and from the shift space; and means to move each carrier at the lower level directly upward to the upper level into a space vacated by a train.

2. In a two-level storage structure at least one rank of carriers at the lower level and at least one rank of carriers at the upper level; those carriers in each upper rank being vertically aligned with the carriers in each lower rank; a shift space at one end of each upper rank; means to connect any number of carriers in each upper rank to form a train; means to move the train to and from the shift space; individual lift cables attached to every carrier in each lower rank; a slidable member positioned beneath each lower rank, and means attached to said member to engage any desired lift cable whereby the carrier attached to that cable is moved to the upper level into a space vacated by a train.

3. In a two-level storage building a plurality of carriers regularly arranged at each storage level in rank and file and so positioned that the carriers at different storage levels are vertically aligned; those carriers normally positioned at the lower level being restricted to move in a vertical direction and those carriers positioned at the upper level being restricted to move in a horizontal direction; a shift space at the upper storage level, said shift space being positioned at the end of each rank parallel and adjacent to the last file; means to connect any number of the upper level carriers in a rank to form a train; means to move the train to and from the shift space; and means to move each carrier at the lower storage level directly upward to the upper level into a space vacated by a train.

4. In a two-level storage building, a plurality of carriers regularly arranged at each storage level in rank and file and so positioned that the carriers at different storage levels are vertically aligned; a shift space at the upper storage level the width and length of a file, said shift space being positioned at the end of each rank parallel and adjacent to the last file; means to connect any number of the carriers in a rank to form a train; means to move the train to and from the shift space; cable means attached to each carrier at the lower storage level; and means to engage any desired cable and move the carrier vertically between floors.

5. In a two-level storage structure, a plurality of vertically movable carriers positioned at the lower level; wheels mounted on each carrier at the lower level engaging vertical tracks that extend from the lower level to the upper level; a lift cable attached to each carrier at the lower level and passing over pulleys positioned beneath said carrier; a plurality of solenoid operated cable hooks to engage any desired lift cable and move the same in a horizontal direction whereby the carrier attached to the engaged cable is moved vertically from the lower level to the upper level; a plurality of horizontally movable carriers positioned at the upper level; wheels mounted on each carrier at the upper level engaging horizontal tracks that align the upper level carriers directly above the lower level carriers to form at least one rank; means to connect any number of upper level carriers in a particular rank to form a train and means to move the train to and from a shift space provided at the end of each rank of upper level carriers.

References Cited in the file of this patent

UNITED STATES PATENTS

| | | |
|---|---|---|
| 1,394,999 | McKinstry | Oct. 25, 1921 |
| 1,584,212 | Burrell | May 11, 1926 |
| 1,667,467 | Young | Apr. 24, 1928 |
| 1,852,633 | Ziebarth | Apr. 5, 1932 |
| 1,924,130 | Morton | Aug. 29, 1933 |
| 2,031,392 | Taylor | Feb. 18, 1936 |
| 2,052,690 | Austin | Sept. 1, 1936 |
| 2,186,854 | Auger et al. | Jan. 9, 1940 |
| 2,815,873 | Moore | Dec. 10, 1957 |